US006358611B1

(12) United States Patent
Nagasawa et al.

(10) Patent No.: US 6,358,611 B1
(45) Date of Patent: Mar. 19, 2002

(54) ULTRAFINE PARTICLES COMPRISING AN ORGANOMETALLIC CORE AND PROCESS FOR THE PRODUCTION THEREOF

(75) Inventors: Hiroshi Nagasawa, Osaka; Masami Nakamoto, Hyogo, both of (JP)

(73) Assignees: Tomoe Works Co., Ltd.; Osaka Municipal Government, both of Osaka (JP)

(*) Notice: Subject to any disclaimer, the term of this patent is extended or adjusted under 35 U.S.C. 154(b) by 0 days.

(21) Appl. No.: 09/331,343

(22) PCT Filed: Dec. 17, 1997

(86) PCT No.: PCT/JP97/04648

§ 371 Date: Aug. 29, 2000

§ 102(e) Date: Aug. 29, 2000

(87) PCT Pub. No.: WO98/26889

PCT Pub. Date: Jun. 25, 1998

(30) Foreign Application Priority Data

Dec. 19, 1996 (JP) .............................. 8-355318

(51) Int. Cl.$^7$ .............................. B32B 5/16
(52) U.S. Cl. .............. 428/403; 75/362; 419/23; 423/417; 423/418; 423/592; 428/570; 427/229

(58) Field of Search ................ 428/403, 570; 427/229; 75/362; 419/23; 423/417, 418, 592

(56) References Cited

U.S. PATENT DOCUMENTS

| | | | | | |
|---|---|---|---|---|---|
| 3,965,046 | A | * | 6/1976 | Deffeyes et al. | 252/472 |
| 4,061,824 | A | * | 12/1977 | Deffeyes et al. | 428/328 |
| 5,019,531 | A | * | 5/1991 | Awaya et al. | 437/180 |
| 5,094,686 | A | * | 3/1992 | Kawakami et al. | 75/343 |
| 5,250,101 | A | * | 10/1993 | Hidaka et al. | 75/362 |
| 5,698,483 | A | * | 12/1997 | Ong et al. | 501/12 |
| 5,800,636 | A | * | 9/1998 | Tsukada et al. | 148/306 |
| 6,254,662 | B1 | * | 7/2001 | Murray et al. | 75/348 |

* cited by examiner

Primary Examiner—Hoa T. Le
(74) Attorney, Agent, or Firm—Knobbe, Martens, Olson & Bear, LLP

(57) ABSTRACT

Primarily dedicated to the production of ultrafine particles with good dispersion stability on a industrial scale, the invention provides ultrafine particles characterized in that each of its constituent particles comprises a shell substantially composed of a metal organic compound and a core substantially composed of the metal derived from the metal organic compound, the ultrafine particles having a mean diameter of 1–100 nm, and a process for producing the ultrafine particles.

6 Claims, 3 Drawing Sheets metal organic compound    organic group    metal atom

ULTRAFINE PARTICLES COMPRISING AN ORGANOMETALLIC CORE AND PROCESS FOR THE PRODUCTION THEREOF

TECHNICAL FIELD

This invention relates to ultrafine particles and a process for producing the particles.

BACKGROUND ART

Ultrafine particles not greater than 100 nm in diameter are considerably different from ordinary particles in various characteristics. For example, gold (Au) shows a marked depression of its melting point when its diameter is reduced to 10 nm or less. Furthermore, ultrafine particles exhibit high catalytic activity, among other characteristics, thus being materials offering new application possibilities in a variety of fields. Ultrafine particles of metals, in particular, are expected to find application in the low-temperature sintering pastes for wiring electronic devices.

However, the conventional production technology for ultrafine particles has many problems. For example, one known process comprises vaporizing a starting metal in vacuo in the presence of a minor amount of gas and recovering ultrafine particles of the metal from the gas phase. However, this process yields only a small amount of ultrafine particles per batch. Moreover, the vaporization of a metal requires a equipment such as an electron beam, plasma, laser or induction heater and, when the cost of production is taken into consideration, the process cannot be considered to be suited for mass production. Furthermore, the ultrafine particles obtainable by such a gas-phase technology have the physical drawback that they are rather ready to undergo coagulation.

In contrast to the above gas-phase technology, there is known a technology by which ultrafine particles are prepared from a liquid phase. For example, a known process comprises reducing an ammoniacal silver nitrate complex solution in a hydrophobic reactor to give ultrafine particles of silver. However, the ultrafine particles obtainable by such liquid-phase technology are also comparatively ready to undergo coagulation.

Moreover, those processes require coating with a surfactant in order that a stable dispersion may be insured by a protective colloid effect but such a method has room for improvement in the dispersion stability of particles.

DISCLOSURE OF THE INVENTION

Figure 1:
FIG. 1 is a schematic diagram showing the ultrafine particles according to this invention.
Figure 1:
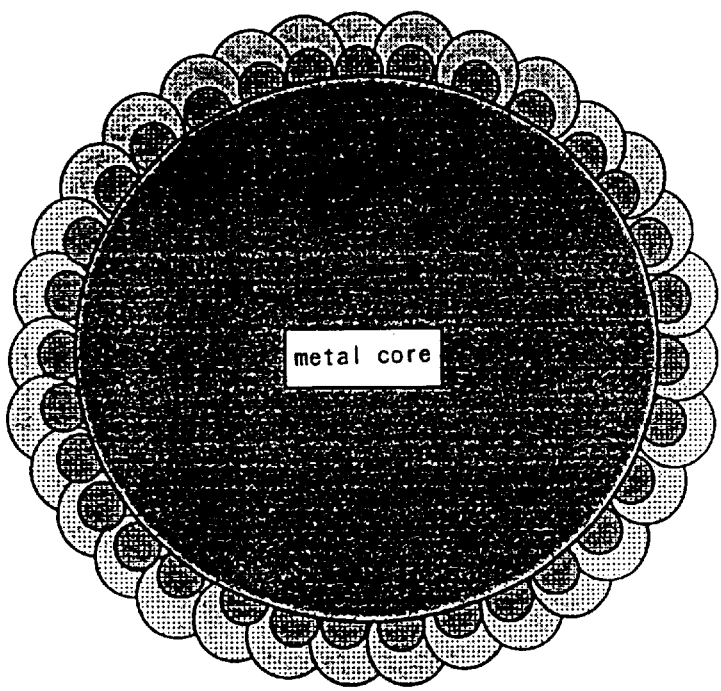

For the industrial production of ultrafine particles having improved dispersion stability, the state of the art calls for the advent of a further innovation. An object of this invention, therefore, is to provide a technology for producing ultrafine particles having excellent dispersion stability on an industrial scale.

In view of the above state of the art the inventor of this invention did much research and, as a consequence, found that the ultrafine particles produced by the specific process herein defined express some unique characteristics due to their unique structure. The inventor accordingly has developed this instant invention.

This invention, therefore, relates to the following ultrafine particles and production process.

1. Ultrafine particles characterized in that each of said particles comprises (a) a metal organic compound and (b) a metal component derived from said metal organic compound, said metal organic compound substantially forming a core, said metal component surrounding the core, and that said ultrafine particles have a mean diameter of 1–100 nm.

2. A process for producing ultrafine particles characterized by comprising heating a metal organic compound in an inert gas atmosphere isolated from atmospheric air at a temperature not less than the decomposition start temperature but less than the complete decomposition temperature of the metal organic compound.

The ultrafine particles and production process of this invention are now described in detail.

The ultrafine particles characterized in that each of said particles comprises (a) a metal organic compound and (b) a metal component derived from said metal organic compound, said metal organic compound substantially forming a core, said metal component surrounding the core, and that said ultrafine particles have a mean diameter of 1–100 nm.

In the context of this invention, (a) the metal organic compound mentioned above includes not only organometal compounds but also metal alkoxides and the like. The metal organic compound is not particularly restricted and even commercial products can be used. As examples, the fatty acid salts such as naphthenates, octanoates, stearates, benzoates, p-toluenecarboxylates, n-decanoates, etc., alkoxides such as isopropoxides, ethoxides, etc. and metal acetylacetonato complexes can be mentioned. Among those compounds, oleates, p-toluenecarboxylates, stearates, n-decanoates, ethoxides, and acetylactonato complexes are particularly preferred. Among metal salts of fatty acids, salts of straight-chain fatty acids are preferred, and generally those fatty acids containing about 6–30 carbon atoms, preferably 10–18 carbon atoms, are selected.

Those metal organic compounds can be used each independently or in a combination of two or more species. The metal of said metal organic compound is not particularly restricted, either, but can be judiciously selected according to the intended use of the end product.

(b) The metal component mentioned above is not particularly restricted provided that it is derived from said metal organic compound but is preferably at least one member selected from among Cu, Ag, Au, Zn, Cd, Ga, In, Si, Ge, Sn, Pd, Fe, Co, Ni, Ru, Rh, Pd, Os, Ir, Pt, V, Cr, Mn, Y, Zr, Nb, Mo, Ca, Sr, Ba, Sb and Bi. The metal component in this invention includes metals in all forms, such as metals as simple substances and mixtures, alloys and intermetallic compounds of the metals.

The proportion of the metal in the ultrafine particle of this invention can be judiciously selected according to the intended use of the end product, among other factors, but may generally be about 50–90 weight %. When the particles is used for metallic coating purposes, for instance, the proportion of the metal component is preferably about 50–80 weight %, particularly 60–80 weight %.

The schematic structure of the ultrafine particle of this invention is shown in FIG. 1. The ultrafine particle according to this invention comprises (a) a metal organic compound and (b) the metal component derived from said metal organic compound, with its core being substantially composed of said metal component and surrounded substantially by said metal organic compound. The metal organic compound and the metal derived from it exist in the particle as an integral entity formed as a part or the whole of either component is chemically bound to the counterpart component. In this respect, the particle is different from the conventional surfactant-coated particle.

The core (metal core) substantially composed of the metal component may contain the metal organic compound used and the organic component derived from it in minor proportions depending on cases but such cases also fall within the scope of the invention. Similarly, the shell portion surrounding the metal core is substantially composed of the metal organic compound used but may likewise contain the metal and organic component derived therefrom.

The mean diameter of the ultrafine particles is generally about 1–100 nm but can be adjusted according to the intended use of the end product and other factors. Taking metallic coating as an example of application, the diameter is generally about 1–50 nm, preferably 1–10 nm.

The ultrafine particles of this invention can be produced by, for example, heating a metal organic compound in an inert gas atmosphere isolated from atmospheric air at a temperature not less than its decomposition start temperature but less than its complete decomposition temperature.

The metal organic compound is not particularly limited to any specific kind but any of the compounds mentioned hereinbefore can be used. Preferred, among them, are metal oleates, p-toluenecarboxylates, stearates and n-decanoates, metal ethoxides, and metal acetylacetonato complexes.

Referring to the metal as a component of said metal organic compound, when the resulting ultrafine particles are to be used for metallic coating purposes, the metal component thereof will constitute a dominant part of the metallic paint film and, therefore, the kind of metal can be judiciously selected according to the intended application. More particularly, when a metallic paint film is the end product, silver stearate, copper oleate or the like can be used. Those compounds can be used as purchased from commercial sources.

Even those metal organic compounds which are either sublimible or have the property to decompose readily can also be used by exercising some ingenuity, for example adding a high-boiling solvent for inhibiting sublimation.

In conducting the process of this invention, alloy-type ultrafine particles can also be produced by pre-mixing metal organic compounds containing two or more kinds of metals.

The form of the starting metal organic compound is not particularly restricted but may be a liquid or a solid (powdery, granular). In the case of a solid, the compound may be one having a melting point or one not having a melting point. In this invention, compounds having melting points are particularly preferred and, as such, fatty acid salts can be used with advantage. When a compound not having a melting point is used, it is dissolved in a solvent capable of dissolving the compound and having a boiling point higher than the decomposition start temperature of the compound beforehand and then heated.

The heating temperature is not particularly restricted provided that the metal organic compound is not completely decomposed at the temperature. Thus, all that necessary is that the heating temperature be within the range not less than the decomposition start temperature but less than the complete decomposition temperature of the compound. The decomposition start temperature means a temperature at which the organic component of the metal organic compound begins to decompose and the complete decomposition temperature means a temperature at which the metal organic compound is completely decomposed. Within this intervening temperature range, the heating time can be judiciously selected according to the kind of metal organic compound and other factors. In the case of a metal organic compound having a decomposition start temperature of about 200° C. and a complete decomposition temperature of about 400° C., for instance, the heating temperature can be maintained within the range of 200° C. to 400° C. The heating time can be judiciously adjusted according to the heating temperature, among other factors.

The heating atmosphere is not particularly restricted provided that it is an inert gas atmosphere isolated from atmospheric air and the inert gas may for example be nitrogen, carbon dioxide, argon or helium. Those gases are preferably used in the form of streams.

In heating, various alcohols can be added to the metal organic compound. By this procedure, the heating temperature (decomposition start temperature) can be lowered, among other effects. The kind of alcohol that can be used is not particularly restricted provided that the above-mentioned effect can be obtained. Thus, glycerin, ethylene glycol, and lauryl alcohol, among others, can be mentioned. The level of addition of the alcohol can be judiciously selected according to its species, among other factors, but may generally be about 5–20 parts by weight, preferably 10–15 parts by weight, based on 100 parts by weight of the metal organic compound.

In carrying out the process of this invention, improvements can be realized in workability etc. by adding various known additives such as liquid paraffin, petroleum-series high-boiling solvents, oils, etc. within the range not detracting from the effect of the invention.

Completion of heating may be followed by purification where necessary. For this purpose, the known purification methods can be utilized. For example, centrifugation, membrane filtration, solvent extraction, etc. can be mentioned.

According to the process of this invention, ultrafine particles having a structure different from that of the conventional particles can be obtained by, in particular, subjecting the metal organic compound to a heat treatment at the comparatively low temperature mentioned above in the specific atmosphere.

Thus, since the ultrafine particles according to this invention have a structure such that a metal core is surrounded by a metal organic compound shell, those particles are highly dispersible and, when dispersed in a solvent, assume a solubilized state. Thus, for example, the particles can be dispersed in toluene, hexane, kerosine or the like and put to use or used in the form of a paste as formulated with the known pasting agent.

The ultrafine particles having such characteristics as above according to the invention can be used in a broad range of applications such as electronic materials (printed circuits and conductors, etc.), magnetic materials (magnetic recording media, electromagnetic wave absorbers, electromagnetic resonators, etc.), catalyst materials (high-speed reaction catalysts, sensors, etc.), structural materials (far-infrared materials, composite film-forming materials, etc.), ceramic/metallic materials (sintering auxiliary agents, coating materials, etc.) and medical materials.

BEST MODE FOR CARRYING OUT THE INVENTION

The following examples are intended to further clarify the features of this invention.

Example 1

Ultrafine particles were prepared using silver stearate as the metal organic compound.

First, silver stearate was prepared by the known procedure. Thus, commercial sodium stearate was dissolved in pure water under heating at 60° C. Separately, an equivalent of silver nitrate was dissolved in pure water and the solution was added to the above aqueous solution of sodium stearate. The silver stearate precipitating out was recovered with a suction filter and dried in a dryer.

One-hundred (100) grams of the silver stearate thus prepared was weighed into a round bottom flask of 500 ml capacity and heated in a nitrogen gas stream (flow rate 100 ml/min.). The heating temperature was 250° C. and this temperature was maintained for 4 hours. With the progress of heating, the white silver stearate fused in the first place and then underwent pyrolytic modification, changing in color gradually to assume a purple color in the end. This material was purified by solvent extraction to provide a powder.

Figure 2:
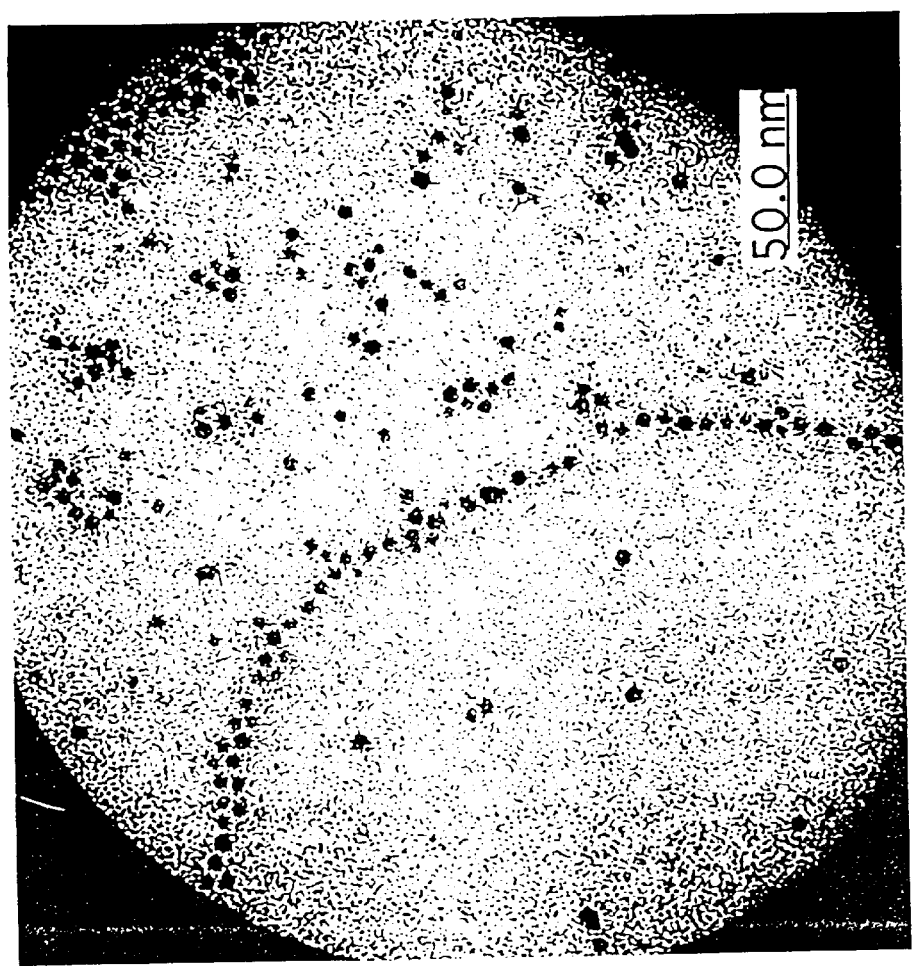
FIG. 2 is an image drawing showing the ultrafine particles obtained in Example 1.
Figure 3:
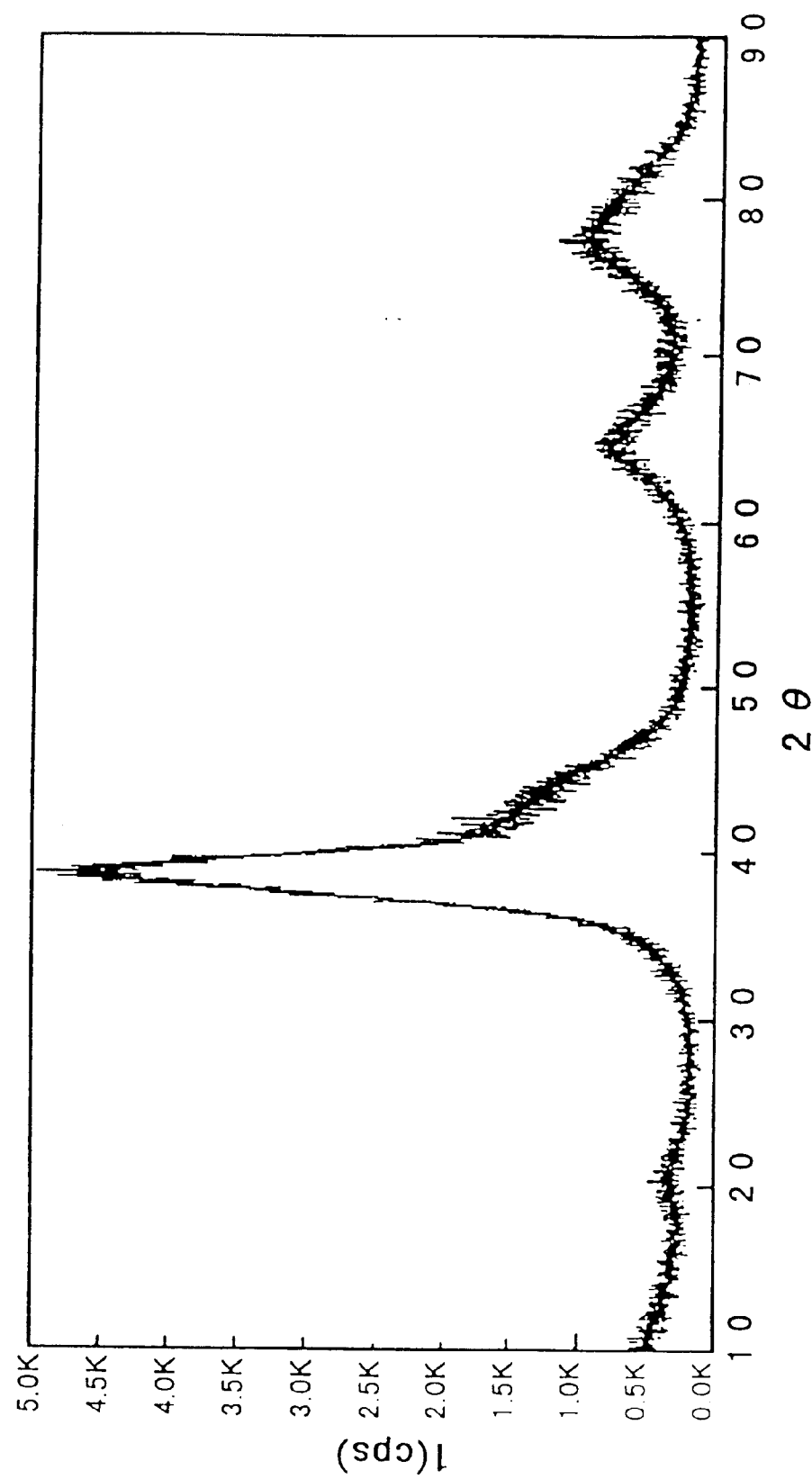
FIG. 3 is an X-ray diffraction pattern of the ultrafine particles obtained in Example 1.

Observation of this modification product particulate artefact with a transmission electron microscope revealed that it comprised ultrafine particles having a diameter of about 5 nm. An image printout is presented in FIG. 2. The powder was also subjected to X-ray diffraction analysis, whereby the presence of a silver metal core could be identified. The diffraction pattern is shown in FIG. 3. Determination of the ratio of the metal by thermal analysis showed that the organic component accounted for about 25 weight %, while elemental and other analyses revealed that the organic component was the stearic acid residue.

Further, when the above artefact comprising ultrafine particles was dispersed in toluene and n-hexane, respectively, a clear dispersion was obtained with no evidence of precipitates in either case. In other words, the particles were found to have been solubilized.

When a polyimide substrate was coated with the above solubilized ultrafine particle dispersion, dried and heated, the coat was ready to become sintered at about 220° C., providing a sintered silver film.

Example 2

Ultrafine particles were prepared using copper oleate as the metal organic compound.

First, copper oleate was prepared by the known procedure. Thus, commercial sodium oleate was dissolved in pure water under heating at 60° C. Separately, an equivalent of copper nitrate was dissolved in pure water and the solution was added to the above aqueous solution of sodium oleate. The copper oleate separating out as oil was recovered using a separatory funnel.

One-hundred (100) grams of the copper oleate thus obtained was weighed into in a round bottom flask of 500 ml capacity and heated in a nitrogen gas stream (flow rate 100 ml/min.). The heating temperature was 300° C. and this temperature was maintained for 4 hours. With the progress of heating, the material underwent pyrolytic modification changing in color gradually to assume a deep green color in the end. This sample was purified by solvent extraction to provide a powder.

Observation of this modification product particulate artefact revealed that it comprised ultrafine particles having a diameter of about 10 nm. By powder X-ray diffraction analysis, the presence of a copper metal core could be identified.

When this particulate artefact comprising ultrafine particles was dispersed in toluene and benzene, respectively, a clear dispersion was obtained with no evidence of precipitates in either case. In other words, the particles were found to have been solubilized.

A glass substrate was coated with the above dispersion and heated under nitrogen, whereby the particles were readily sintered at about 250° C. to provide a sintered copper film.

Example 3

Ultrafine particles were prepared using nickel p-toluenecarboxylate as the metal organic compound.

First, nickel p-toluenecarboxylate was prepared by the known procedure. Thus, commercial p-toluenecarboxylic acid and sodium hydroxide were dissolved in pure water under heating at 60° C. to give sodium p-toluenecarboxylate. Separately, an equivalent of nickel chloride was dissolved in pure water and the solution was added to the above aqueous solution of sodium p-toluenecarboxylate. The nickel p-toluenecarboxylate that precipitated out was recovered with a suction filter and dried in a dryer.

One-hundred (100) grams of the nickel p-toluenecarboxylate thus prepared was weighed into a round bottom flask of 500 ml capacity and heated in an argon gas stream (flow rate 100 ml/min.). The heating temperature was 290° C. and this temperature was maintained for 5 hours. With the progress of heating, the nickel p-toluenecarboxylate fused in the first place and then underwent pyrolytic modification, changing in color gradually to assume a blue-green color in the end. This material was purified to give a powder.

The powder was also subjected to X-ray diffraction analysis, whereby the presence of a nickel metal core could be identified. Observation of this artefact with a transmission electron microscope revealed that it comprised ultrafine particles having a diameter of about 10 nm. Determination of the ratio of the metal by thermal analysis showed that the organic component accounted for about 30 weight %, and elemental and other analyses revealed that the organic component was the p-toluenecarboxylic acid residue.

Further, when the above artefact comprising ultrafine particles was dispersed in kerosine, a clear dispersion was obtained.

Example 4

Ultrafine particles were prepared using silver oleate as the metal organic compound.

First, silver oleate was prepared by the known procedure. Thus, commercial sodium oleate was dissolved in pure water under heating at 60° C. Separately, an equivalent of silver nitrate was dissolved in pure water and the resulting solution was added to the above aqueous solution of sodium oleate. The silver oleate separating out was recovered with a suction filter and dried in a dryer.

One-hundred (100) grams of the silver oleate thus prepared was weighed into a round bottom flask of 500 ml capacity and after addition of 100 ml of a naphthenic hydrocarbon solvent having a boiling point of 250° C., the mixture was heated in a helium gas stream (flow rate 100 ml/min.). The heating temperature was 250° C. and this temperature was maintained for 4 hours. With the progress of heating, the white silver oleate fused in the first place and then underwent pyrolytic modification, changing in color gradually to become a purple liquid in the end. This material was purified using an ultrafiltration membrane to give a powder.

Observation of the modification powder with a transmission electron microscope revealed that it comprised ultrafine particles having a diameter of about 4 nm. This particulate artefact was also subjected to X-ray diffraction analysis, whereby the presence of a silver metal core could be identified. Determination of the ratio of the metal by thermal analysis showed that the organic component accounted for about 20 weight %, and elemental and other analyses revealed that the organic component was the oleic acid residue.

Further, when the above artefact comprising ultrafine particles was dispersed in toluene and n-hexane, respectively, a clear dispersion was obtained with no evidence of precipitates in either case. In other words, the particles were found to have been solubilized.

Example 5

Ultrafine particles were prepared using silver n-decanoate as the metal organic compound.

First, silver n-decanoate was prepared by the known procedure. Thus, commercial n-decanoic acid and sodium hydroxide were put in pure water and dissolved under heating at 60° C. to prepare sodium n-decanoate. Separately, an equivalent of silver nitrate was dissolved in pure water and the resulting solution was added to the above aqueous solution of sodium n-decanoate. The silver n-decanoate precipitating out was recovered with a suction filter and dried in a dryer.

One-hundred (100) grams of the silver n-decanoate thus prepared was weighed into a round bottom flask of 500 ml capacity, and after addition of ethylene glycol, the mixture was heated on an oil bath in a nitrogen stream (flow rate 100 ml/min.). The heating temperature was 150° C. and this temperature was maintained for 4 hours. With the progress of heating, the white silver n-decanoate fused in the first place and then underwent pyrolytic modification, changing in color gradually to assume a purple color in the end. This material was purified by solvent extraction to give a powder.

When the powder consisting of the ultrafine particles were dispersed in toluene and n-hexane, respectively, a clear dispersion was obtained with no evidence of precipitates in either case. In other words, the particles were found to have been solubilized.

Example 6

Ultrafine particles were prepared using niobium ethoxide as the metal organic compound.

The niobium ethoxide was a liquid product purchased from a commercial source. Ten (10) grams of the niobium ethoxide was weighed into a round bottom flask of 100 ml capacity and after addition of liquid paraffin, the mixture was heated in an argon gas stream (flow rate 100 ml/min.). The heating temperature was 150° C. and this temperature was maintained for 4 hours. With the progress of heating, the niobium ethoxide underwent pyrolytic modification, changing in color gradually to assume a gray color in the end. This sample was purified by solvent extraction to provide a powder. Observation of the powder with a transmission electron microscope revealed that it comprised ultrafine particles measuring about 20 nm in diameter.

Example 7

Ultrafine particles were prepared using copper acetylacetonate as the metal organic compound.

The copper acetylacetonate was purchased from a commercial source. Ten (10) grams of this copper acetylacetonate was weighed into a round bottom flask of 100 ml capacity. After addition of xylene, the mixture was heated in a nitrogen gas stream (flow rate 100 ml/min.). The heating temperature was 150° C. and this temperature was maintained for 4 hours. With the progress of heating, the copper acetylacetonate underwent pyrolytic modification, changing in color gradually to finally assume a green color. This sample was purified by centrifugation to provide a powder. Observation of this modification powder revealed that it comprised ultrafine particles measuring about 50 nm in diameter.

What is claimed is:

1. Ultrafine particles characterized in that each of said particles comprises (a) at least one metal organic compound selected from the class consisting of the alkoxides, acetylacetonato complexes and metal salts of $C_{6-30}$ fatty acids and (b) a metal component derived from said metal organic compound, said metal organic compound substantially forming a core and said metal component surrounding the core, and that said ultrafine particles have a mean diameter of 1–100 nm.

2. The ultrafine particles according to claim 1 wherein the metal component is at least one member of the class consisting of Cu, Ag, Au, Zn, Cd, Ga, In, Si, Ge, Sn, Pd, Fe, Co, Ni, Ru, Rh, Os, Ir, Pt, V, Cr, Mn, Y, Zr, Nb, Mo, Ca, Sr, Ba, Sb and Bi.

3. The ultrafine particles according to claim 1 or 2 wherein the metal accounts for 50–90 weight %.

4. A process for producing ultrafine particles characterized by comprising heating at least one metal organic compound selected from the class consisting of the alkoxides, acetylacetonato complexes and metal salts of $C_{6-30}$ fatty acids in an inert gas atmosphere isolated from atmospheric air at a temperature not less than the decomposition start temperature but less than the complete decomposition temperature of the metal organic compound.

5. The process according to claim 4 wherein a stream of at least one member of the class consisting of nitrogen, carbon dioxide, argon and helium is used as the inert gas atmosphere.

6. The process according to any of claims 4 or 5 wherein an alcohol is added to the metal organic compound in heating.

* * * * *

UNITED STATES PATENT AND TRADEMARK OFFICE
CERTIFICATE OF CORRECTION

PATENT NO. : 6,358,611 B1  
DATED : March 19, 2002  
INVENTOR(S) : Hiroshi Nagasawa and Masami Nakamoto It is certified that error appears in the above-identified patent and that said Letters Patent is hereby corrected as shown below:

<u>Title page,</u>  
Item [54], Title, should read -- ULTRAFINE PARTICLES AND PROCESS FOR THE PRODUCTION THEREOF --

Signed and Sealed this

Thirteenth Day of August, 2002

*Attest:*

*Attesting Officer*

JAMES E. ROGAN  
*Director of the United States Patent and Trademark Office*